US010006710B2

(12) United States Patent
Isokäänta et al.

(10) Patent No.: US 10,006,710 B2
(45) Date of Patent: Jun. 26, 2018

(54) DRYING OF MATERIAL

(71) Applicant: SFTec Oy, Oulu (FI)

(72) Inventors: Jani Isokäänta, Oulu (FI); Matti Aula, Oulu (FI); Juha Roininen, Oulu (FI)

(73) Assignee: SFTEC OY, Oulu (FI)

( * ) Notice: Subject to any disclaimer, the term of this patent is extended or adjusted under 35 U.S.C. 154(b) by 492 days.

(21) Appl. No.: 14/677,290

(22) Filed: Apr. 2, 2015

(65) Prior Publication Data

US 2015/0292800 A1    Oct. 15, 2015

(30) Foreign Application Priority Data

Apr. 10, 2014 (FI) .................................... 20145343

(51) Int. Cl.
| | | |
|---|---|---|
| *F26B 9/00* | (2006.01) | |
| *F26B 17/08* | (2006.01) | |
| *F26B 17/00* | (2006.01) | |
| *F26B 17/14* | (2006.01) | |
| *F26B 17/26* | (2006.01) | |
| *B65G 25/08* | (2006.01) | |

(52) U.S. Cl.
CPC .............. *F26B 17/08* (2013.01); *B65G 25/08* (2013.01); *F26B 17/001* (2013.01); *F26B 17/145* (2013.01); *F26B 17/26* (2013.01)

(58) Field of Classification Search
CPC .... F26B 17/001; F26B 17/003; F26B 17/006; F26B 17/08; F26B 17/26; F26B 17/145; B65G 25/065; B65G 25/08
USPC ......... 34/164, 166, 167, 168, 171, 172, 178, 34/179, 443
See application file for complete search history.

(56) References Cited

U.S. PATENT DOCUMENTS 2,050,477 A  *  8/1936  Weisselberg .......... F26B 17/006
                                                        34/164
3,060,589 A      10/1962 Wallin

FOREIGN PATENT DOCUMENTS

| DE | 10310258 A1  | 9/2004 |
| GB | 139278 A     | 3/1920 |
| KR | 20090132156 A | 12/2009 |
| LT | 4610 B       | 1/2000 |
| WO | 2012/132025 A1 | 10/2012 |

OTHER PUBLICATIONS

Sep. 11, 2015 Search Report issued in European Patent Application No. 15 16 2439.

(Continued)

*Primary Examiner* — John McCormack
(74) *Attorney, Agent, or Firm* — Oliff PLC

(57) ABSTRACT

There is provided a multi-module counterflow drying apparatus (100) for drying material, the apparatus (100) comprising: a material inlet (102); a material outlet (104); a heat inlet (108) for inputting heat to the apparatus such that the heat traverses the apparatus in the opposite direction than the material; and a plurality of mutually interchangeable modules (110) stacked on top of each other, wherein the material is configured to move in the apparatus from one module to another such that the movement direction of the material in a given module is opposite to the movement direction of the material in a module above or below, wherein each module (110) comprises: movable paddles (210) configured to discontinuously move the material forward in the module (110).

10 Claims, 4 Drawing Sheets

(56) References Cited

OTHER PUBLICATIONS

Dec. 3, 2014 Search Report issued in Finnish Patent Application No. 20145343.

* cited by examiner

DRYING OF MATERIAL

FIELD OF THE INVENTION

The invention relates generally to drying of material.

BACKGROUND

It may be important to dry the material before use. There are a variety of different drying techniques which may be used for drying material, such as sand, chips, biomass, or sludge, for example. These known drying techniques may include use of a rotary dryer, a belt dryer, a fluidized bed, or a flash dryer. However, the structures of these devices pose criteria to the type of input material to be dried. Further, these devices may be hard to manufacture/maintain/repair, are costly, and the end result is not optimal.

BRIEF DESCRIPTION OF THE INVENTION

According to an aspect of the invention, there is provided a multi-module counterflow drying apparatus for drying material, the apparatus comprising: a material inlet for inputting material to the upperpart of the apparatus; a material outlet for outputting dried material from the lower part of the apparatus; a heat inlet for inputting heat to the apparatus such that the heat traverses the apparatus in the opposite direction than the material; and a plurality of mutually interchangeable modules stacked on top of each other, wherein the material is configured to move in the apparatus from one module to another such that the movement direction of the material in a given module is opposite to the movement direction of the material in a module above or below the given module, wherein each module comprises movable paddles configured to discontinuously move the material forward in the module.

According to an aspect of the invention, there is provided a method for drying material in a multi-module counterflow drying apparatus, the method comprising: feeding material to the upperpart of the apparatus; outputting material from the lower part of the apparatus; inputting heat to the apparatus such that the heat traverses the apparatus in the opposite direction than the material, wherein the apparatus comprises: a plurality of mutually interchangeable modules stacked on top of each other, wherein the material is configured to move in the apparatus from one module to another such that the movement direction of the material in a given module is opposite to the movement direction of the material in a module above or below the given module, wherein each module comprises movable paddles configured to discontinuously move the material forward in the module.

According to an aspect of the invention, there is provided an apparatus comprising means for performing any of the embodiments as described in the appended claims.

Embodiments of the invention are defined in the dependent claims.

LIST OF THE DRAWINGS

In the following, the invention will be described in greater detail with reference to the embodiments and the accompanying drawings, in which FIG. 1A presents a diagonal view of the apparatus, according to an embodiment;

DESCRIPTION OF EMBODIMENTS

Figure 1A:
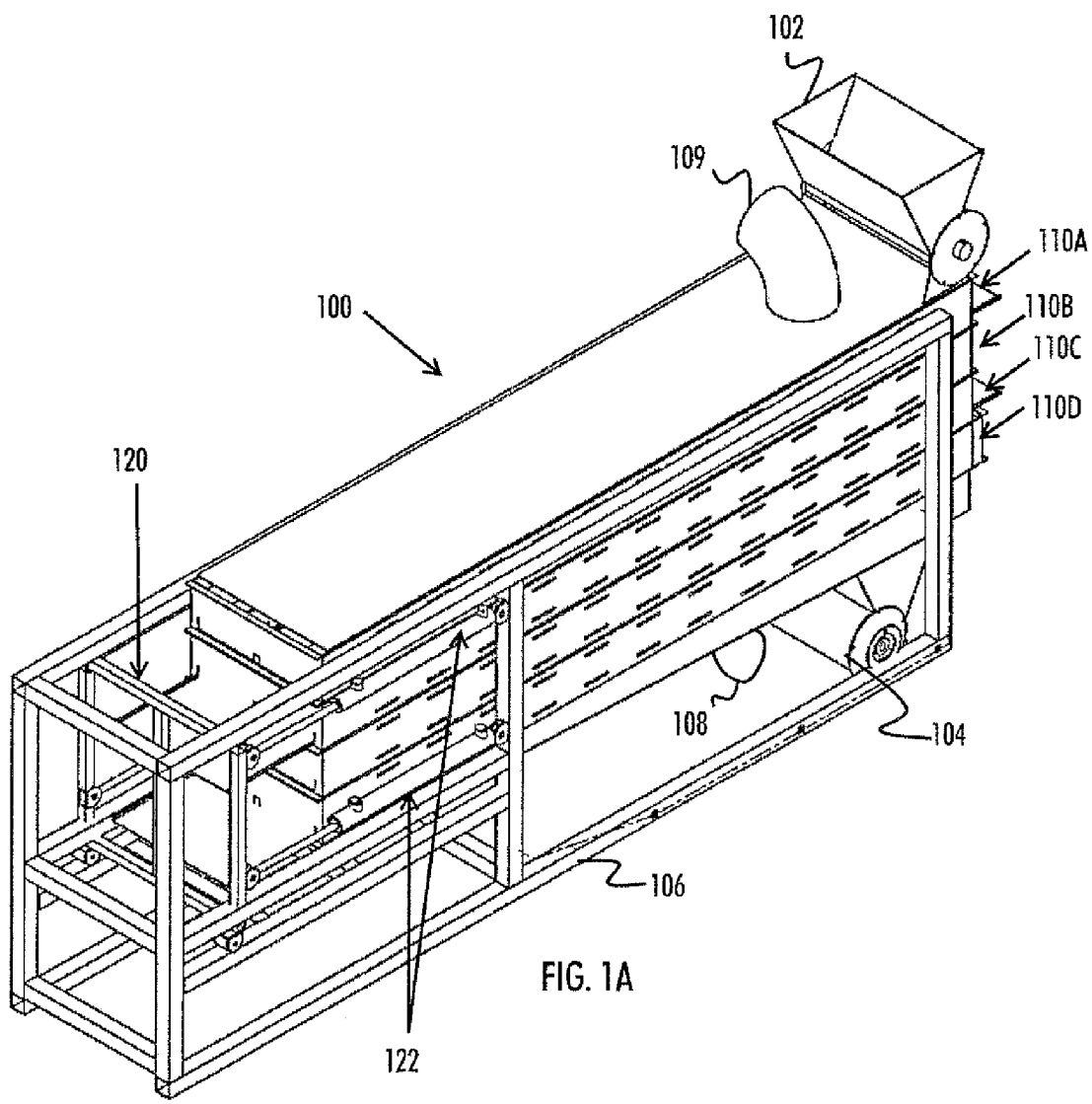
FIG. 1B shows a side view of the apparatus showing the material flow in the apparatus, according to an embodiment.

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Often it may be important to remove moisture from material before applying the material for a certain purpose. For example, sludge may need to be dried before it may be used as a fertilizer, or moisture may need to be removed from sand before the sand may be reused. As said, different types of drying devices may be applied for drying of material. However, the devices pose criteria to the material, require high manufacturing costs, cause difficulties in manufacturing/maintenance of the device, and/or result in inefficient drying. For example, a rotary dryer (indirect or direct heat) may perform poorly as the heat is mostly present in the upper parts of the rotary dryer whereas the material to be dried is located at the lower parts of the rotary drier. Further, a rotary drier may cause the material to pelletize (i.e. to accumulate in piles/junks) and it may be difficult to detect how the material changes during the drying process. As another option, a belt dryer may be expensive and, as is the case with the other types of known driers, also in the belt drier, the repairing options may be poor and require extensive amount of work. Therefore, a more optimal solution is required for drying material.

As shown in FIGS. 1-5, there is provided a multi-module counterflow drying apparatus 100 for drying material. The apparatus/device 100 comprises a material inlet 102 for inputting the material to the upperpart of the apparatus 100 and a material outlet 104 for outputting dried material from the lower part of the apparatus 100. The apparatus may be supported by a support structure 106 made of metal, for example. The inlet 102 and outlet 104 may be pipes, or other openings for receiving and outputting material, for example. The material to be dried may comprise grain, sand, chips, biomass, or sludge, to mention only a few non-limiting material types. The particle size of the material is not a limiting factor.

In order to provide the drying of the material, heat may be fed to the apparatus 100. Therefore, the apparatus 100 may comprise a heat inlet 108 for inputting heat to the apparatus 100. As the apparatus 100 operates in the counterflow-principle, the inputted heat traverses the apparatus 100 in the opposite direction than the material. The heat inlet 108 may be located at the lower part of the apparatus 100 so that the material inputted at the top of the apparatus 100 may need to travel within the apparatus 100 against the heat. The heat may rise up in the device 100 as it is inputted from the lower part of the apparatus 100. The heat inlet 108 may be a pipe or any conveying channel used to convey heat from a heat source to the apparatus 100.

In an embodiment, the temperature of the heat provided to the apparatus 100 may be between 20-900 degrees, for example. The used temperature may depend on the material characteristics, such as initial moisture content of the material and the desired level of dry content in the end material. The mapping between different types of material and appropriate level of temperature may be empirically derived or it may be based on models.

In an embodiment, the heat is provided from a heat generator operating on oil or gas, for example. In an embodiment, the heat is waste heat from another device in proximity. In an embodiment, the heat may be super-heated steam. The superheated steam may be a gas mixture generated out of water vapour and combustion gas of a fuel. The fuel which generates the required combustion gas may be light fuel oil, for instance.

In an embodiment, the apparatus 100 may comprise a heat outlet 109 for enabling the input heat to exit the apparatus 100. The heat outlet 109 may be located at the upper part of the apparatus 100.

Figure 2:
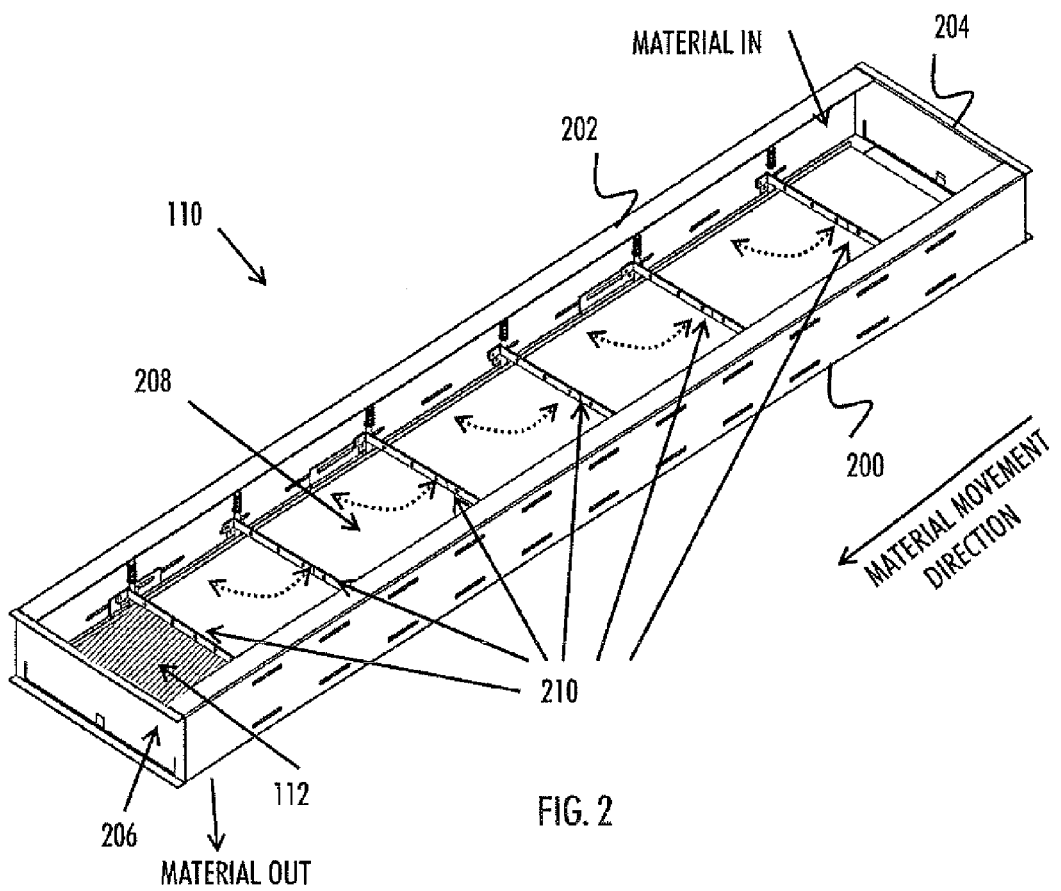
FIG. 2 shows a diagonal view of single module, according to an embodiment.

Further, the apparatus 100 further comprises a plurality of mutually interchangeable modules 110A-110B stacked on top of each other. The modules may from now on be commonly referred with a common reference number 110 for the sake of simplicity. Each module 110 may be made of metal or any other heat tolerant material. Each module 110 may comprise, as shown in FIG. 2, sidewalls 200, 202, end walls 204, 206, and a floor 210. The floor 210 may also be called a base or a bottom. Each module may have the same operating principle in the apparatus 100.

In an embodiment, the length of the module 110, i.e. the distance between the end walls 204, 206, may be 2.5 meters. In an embodiment, the width of the module, i.e. distance between the side walls 200, 202 may be 0.5 meters.

In an embodiment, the module 110 may be open-top box without a roof. This embodiment may provide ease of manufacture. However, in another embodiment, the module 100 may be equipped with the roof, so that the module 110 is at least partly sealed from above. This may provide for improved sealing of the module 110. For example, when using high temperatures of, e.g. 800-900 degrees Celsius, there may be need to provide for the improved sealing. In case there is the roof, each module may further comprise an input aperture at the roof for enabling the moving material in the apparatus to enter the module from the upper module, as will be described.

Figure 1B:
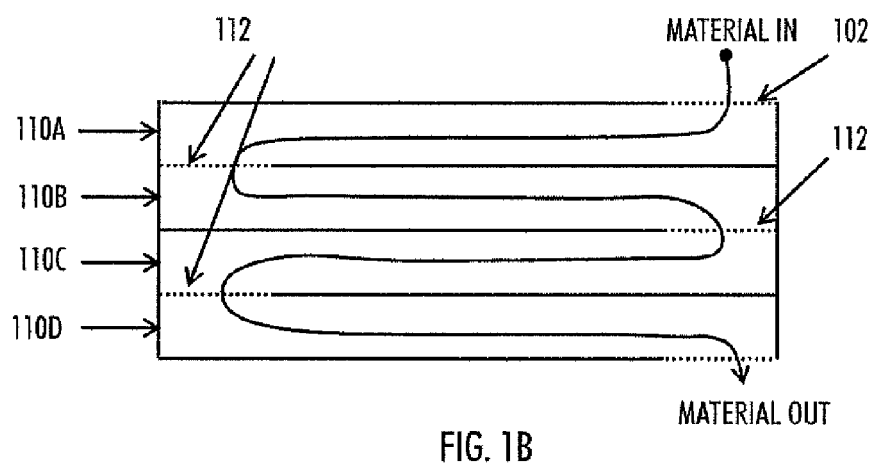

Before discussing further the structure of the modules 110, let us look at how the material moves in the apparatus 100 with respect to FIG. 1B. The movement direction of the material is shown with the solid curve in FIG. 1B. As shown, the material moves in the apparatus from one module 110E to another 110C such that the movement direction of the material in a given module 110B is opposite to the movement direction of the material in a module above 110A or below 110C (i.e. in the adjacent module. This may ensure that the material needs to travel the whole length of the modules 110 in the apparatus 100, and thus be exposed to the heating in each module.

Each module 100 may comprise an exit aperture 112 for enabling the moving material to drop out of the module 110, wherein the exit apertures 112 of adjacent modules are at opposite ends of the adjacent modules 110. That is, the material enters a module 110A at one end of the module 110E and the exits the module 110B at the other end of the module 110B. The adjacent modules 110 may mean modules which are directly next to each other in the vertical direction, such as modules 110B and 110C. The material dropping out of the exit aperture 112 may enter the module below the current module, or the material may drop to the material outlet 104 (i.e. to the ambient). The drop of the material may advantageously mix the material further and in that way enhance the heating/drying process. In an embodiment, the exit aperture 112 is located at the floor 208 of the modules 110.

As further shown in FIG. 2, each module 110 may comprise a plurality of movable paddles 210. The paddles 210 may be used for discontinuously (e.g. impulsively) moving the material forward in the module 110. The forward direction may be towards the exit aperture 112 of the module 110. The discontinuous movement may denote that the material does not continuously move in the movement direction but periodically in impulses. Such movement may be caused by the paddles 210 moving back-and-forth, for example, as will be described later. The paddles 210 may also mix the material by the movement of the paddles 210. This may improve the drying process as the heat better mixes with the material.

Figure 3A:
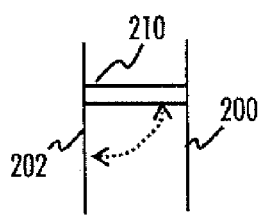
FIGS. 3A to 3C depict details related to movable paddles, according to some embodiments.

In an embodiment, as shown in FIG. 2, each paddle may be pivotally fixed at one of its end to either of the sidewalls 200, 202 of the module 110. In an embodiment, as shown in FIG. 3A, the paddle 210 may be dimensioned such that its length is substantially the same as the length from one sidewall 200 to another 202. This may enable the use of only one paddle at one longitudinal location of the module 110.

Figure 3B:
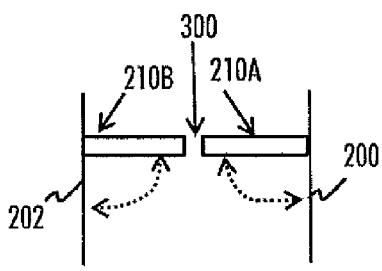

However, in another embodiment shown in FIG. 3B, each module 110 comprises paddles 210A, 210B pivotally fixed on both sidewalls 200, 202, respectively. In an embodiment, the dimensions of the paddles 210A, 201B are such that there remains a gap 300 between the tips of opposite paddles 210A, 201B when the opposite paddles 210A, 201B are pointing towards each other. This may cause the material to move and mix more efficiently in the modules 110. The gab 300 may be for ensuring that the paddles 210A, 210B may freely move. However, in an embodiment, the dimensions of the paddles 210A, 201B are such that the tips of opposite paddles 210A, 201B meet when the opposite paddles 210A, 201B are pointing towards each other. In case the widths of the module is 0.5 meters, then the length of one paddle may be 0.25 meters, for example. This may provide for efficient movement of the material forwards in the module 110.

The shape of the paddle 210 may be designed according to the material to-be-dried. The selection of the shape of the paddle 210 may be based on empirical testing on which type of paddle 210 most efficiently mixes and moves the material in the module 110. The height of the paddle 210 may be proportional to the height of the module 110. In an embodiment, the height of the paddle 210 is substantially the same as the height of the module 110. In such embodiment, no material may pass above the paddles 210. This may allow more control on the movement of the material in the modules 110. In another embodiment, the height of the paddle 210 is smaller than the height of the module 110. In such embodiment, some material may pass above the paddles 210. This may allow efficient mixing of the material.

Figure 3C:
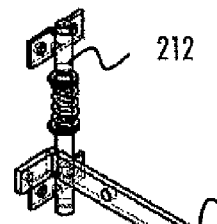

As shown in FIG. 3C, the paddle 210 (or 210A, 210B, also commonly denoted with a reference numeral 210) may be configured to rotate about the pivot 212. The FIG. 3C also shows fastening elements for fastening the pivot to the sidewall 200/202. In an embodiment, each pivot 212 is configured to allow the paddle 210 to rotate substantially 90 degrees about the pivot 212. This may ensure efficient movement and mixing of the material.

Figure 4A:
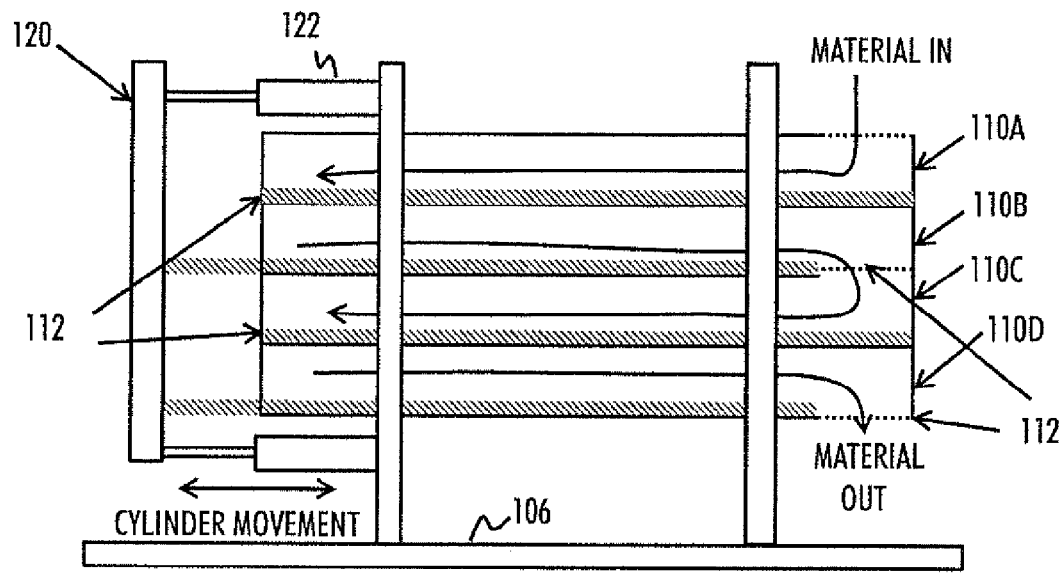
FIGS. 4A and 4B are side views of the apparatus showing the movement of the floor of the modules and the material flow, according to an embodiment.
Figure 4B:
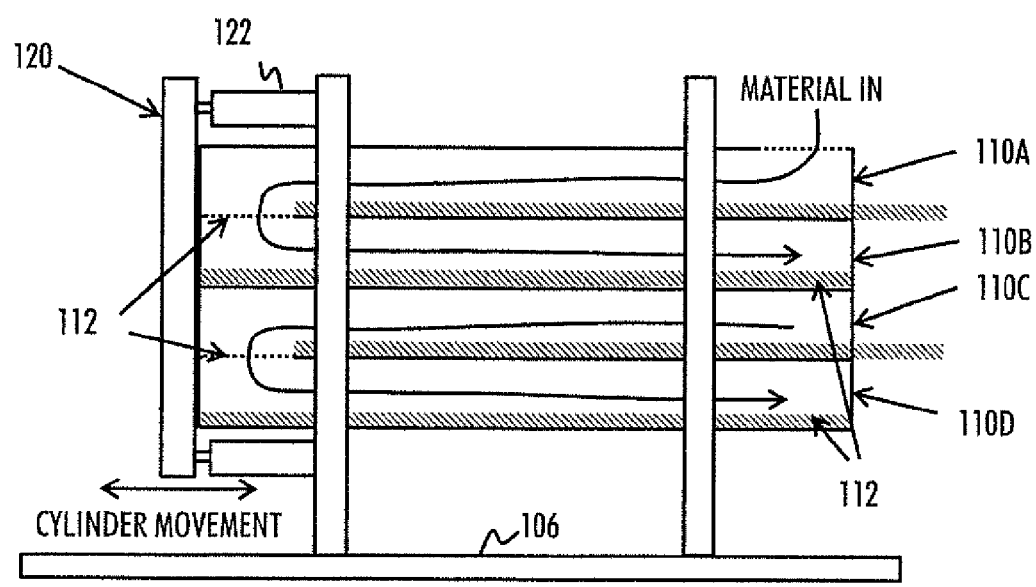
Figure 5:
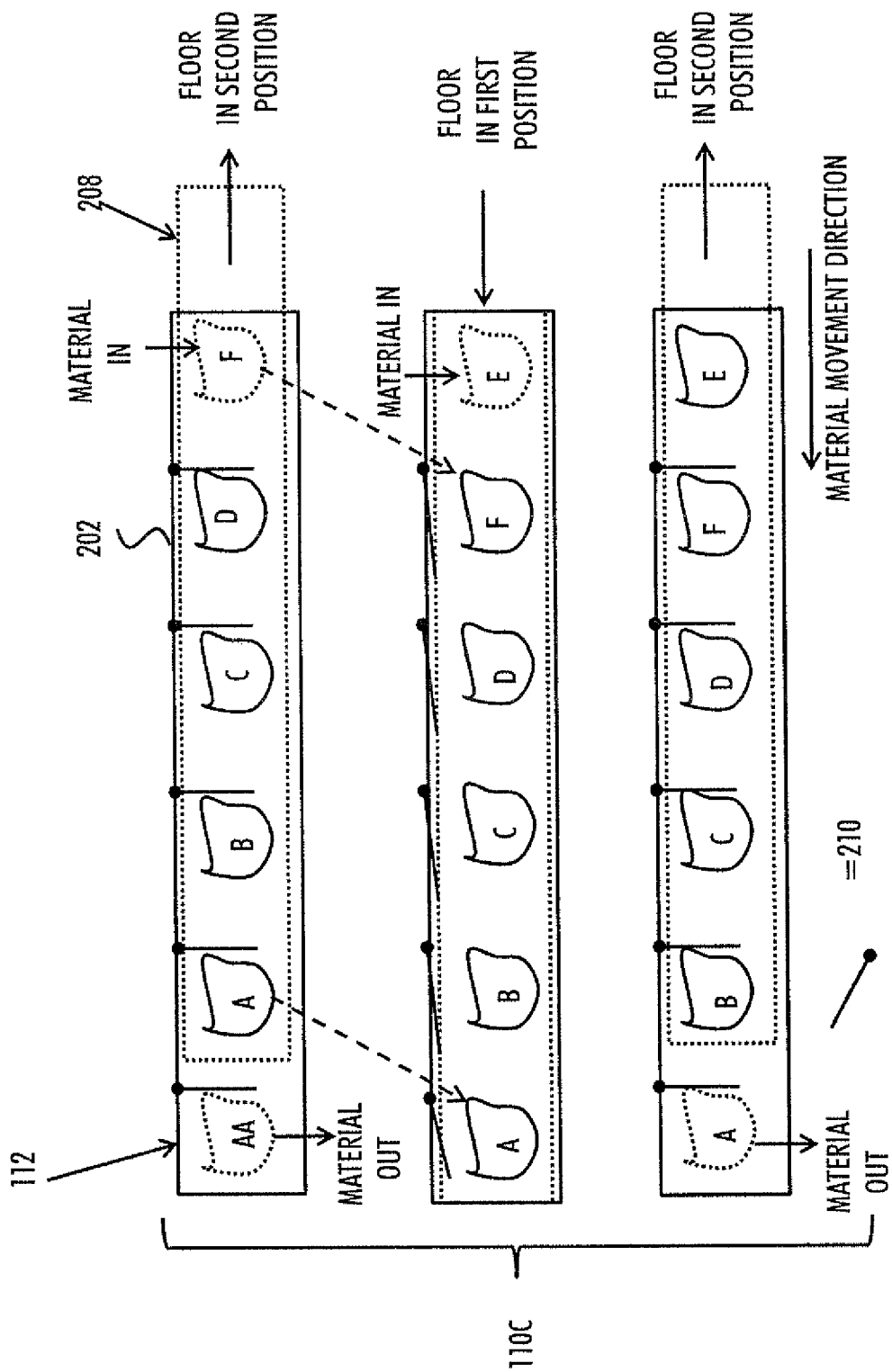
FIG. 5 illustrates a top view of a single module showing the movement of the floor and the paddles, according to an embodiment.

Let us next look at some embodiments for moving the paddles 210 with respect to FIGS. 4A, 4B and 5. In one embodiment, the apparatus further comprises an actuating unit 120 configured to move the floor 208 of each module 110 back-and-forth. The actuating unit 120 may operate as instructed by a controller unit of the apparatus 100. The floors 208 may thus be arranged to freely slide back-and-forth with respect to the rest of the module 110. At least one end wall 200, 202 may comprise a slit or opening for allowing the floor 208 to partly exit the module 110. It may be noted that the length of the module 110 may be substantially the same as the length of the corresponding module floor 208, as shown in the Figures.

In FIGS. 4A and 4B, the moving floors 208 of the modules are marked with boxes with left-leaning diagonal lines. The actuating unit 120 may comprise, for example, cylinders 122 for actuating the movement of the module floors 208. The actuating unit 120 may apply hydraulic or electric power source, for example. The floors 208 may be detachably attached to the actuating unit 120. However, for the sake of simplicity, the attachments between the floors 208 and the actuating unit 120 are not shown. It may be noted that, for example, the floors 208 of the modules 110A and 110C are also attached to the actuating unit 120, although not shown in the Figures. The actuating unit 120 may be arranged to slide on a support frame, as shown in FIG. 1A, for example.

In an embodiment, the actuating unit 120 simultaneously moves the floors 208 of every module 110 such that when the floor 208 of a given module 110B moves to the movement direction of the material, the floor 208 of the adjacent module 110A moves against the movement direction of the material. This may be beneficial so that the one and the same actuating unit 120 may simultaneously move each floor 208 which provides for ease of implementation and savings in costs. In another embodiment, there is a plurality of actuating units driving the floors 208 of different modules 110. This may provide individual control for the operation of a given module.

In an embodiment, as shown in FIGS. 4A and 4B, the movement of the floor 208 back-and-forth in a given module 110 periodically opens and closes the exit aperture 112. It may be that the floors 208 of adjacent modules (e.g. 110A, 110B) are located with respect to each other such that when the exit aperture 112 is open in one module 110A, the exit aperture 112 of the adjacent module 110B is closed. This may be because the floor 208 of a module 110B may have a cylinder-stroke distance offset with respect to the floor 208 of the module 110C, for example, as may be seen in FIGS. 4A and 4B. One cylinder-stroke distance may be 0.5 meters, for example.

FIG. 4A depicts a scenario in which the actuating unit 120 is at a first position, which may be seen as one of the two extreme positions of the actuating unit 120. In the first position, parts of the floors 208 of the even modules 110B, 110D (i.e. modules 2, 4, 6, . . . from the above) may be extracted (pulled out) from one end of these modules 110B, 110D, as shown in FIG. 4A. In such case, the exit apertures 112 of these even modules 110B, 110D are opened from the other ends of these modules 110B, 110D. As such, the material may drop from these modules 110B, 110D to the modules below 110C and to ambient, as shown in FIG. 4A. The floors 208 of the odd modules 110A, 110C (i.e. modules 1, 3, 5, . . . from the above) may be inside the modules 110A, 110C and the exit apertures 112 of these modules 110A, 110C may be closed.

FIG. 4B, on the other hand, depicts a scenario in which the actuating unit 120 is at a second position, which may be seen as the other of the two extreme positions of the actuating unit 120. In the second position, parts of the floors 208 of the odd modules 110A, 110C may be pushed out from one end of these modules 110A, 110C, as shown in FIG. 4A. In such case, the exit apertures 112 of these odd modules 110A, 110C are opened from the other ends of these modules 110A, 110C, As such, the material may drop from these modules 110A, 110C to the modules below 110B, 110D, as shown in FIG. 4B. The floors 208 of the even modules 110B, 110D may be inside the modules 110B, 1100 and the exit apertures 112 of these modules 110B, 1100 may be closed.

Naturally, the movements of the odd and even modules 110 may be switched, depending on which end of the uppermost module the material is fed in to the apparatus. Further, in case several actuating units 120 are used for independently moving the floors 208 of different modules 110A-110D, then the synchronization between the movements or opening/closings of the exit apertures 112 of different modules is not needed.

In any case, the movement of the floor 208 in each module 110 may provide for the opening and closing of the apertures. This may be beneficial in that the material better mixes in the apparatus 100 when the material is exposed to sudden drop from the upper module to the lower module. Further, the moving floor 208 may also contribute to the mixing of the material and to the movement of the material towards the exit apertures 112 in each module 110.

However, in order to more efficiently mix and move the material, the paddles 210 may advantageously be applied. In an embodiment, each paddle 210 is pivotally fixed at one of its end to either of the non-moving sidewalls 200, 202 of the module 110 and the other end of the paddle 210 is configured to move freely according to (i.e. along) the movement of the floor 208 of the module 110, thereby causing the paddle 210 to rotate about the pivot 212. This may be because the free end of the paddle 210 is lying against the moving floor 208, and thereby moving as the floor 208 moves to the direction of the floor movement.

However, the pivot 212 or some other structure of the pivot/attachment mechanism of the paddle 210 may pose limits to the movement of the paddle 210. In an embodiment, each paddle 210 may be configured to rotate about the pivot 212 such that when the floor 208 moves to the movement direction of the material, the paddle 210 may be substantially parallel to the sidewall 200/202. Here, substantially parallel may mean an orientation in which the tip of the paddle 210 points substantially to the direction of the exit aperture 112. That is, the paddle 210 does not block the material moving forwards along the floor 208. Then, when the floor 208 moves against the movement direction of the material, the paddle 210 may be substantially transversely to the sidewall 200/202. Here substantially transversely may mean an orientation in which the paddle 210 blocks the material moving backwards along the floor 208.

Let us look at the allowed movement and how it affects the movement of the material more closely with respect to FIG. 5. FIG. 5 depicts the operation of a given module 110C when looking from above. For the sake of simplicity, paddles 210 are present only on one sidewall 202 of the module 110C. The FIG. 5 depicts the operation of one module in different positions of the actuating unit 120, which moves the floor 208, and consequently the paddles 210.

FIG. 5 shows the operation of the odd module 110C. The dotted box represents the movement of the floor 208 of the module. Let us assume a start scenario (uppermost Figure) in which the module 110C, for example, comprises material AA, A, B, C, D, and E. These may be seen as chunks/piles of material, although a continuous flow of material is more likely case in practise. However, for the sake of simplicity of the description, piles of material are used. Further, material F is inputted to the module 110A. It may be seen that the floor 208 is at the second position and the exit aperture 112 at one end of the module 110C is open. As a result, the material AA locating at that end of the module 110C is dropping out of the module 110C to the module 110D below.

It may be also seen that in this position, the paddles 210 are substantially transversely to the sidewall to which the paddles 210 are pivotally fixed. This may be because the floor 208 has moved backwards against the movement direction of the material and pulled the free ends of the paddles 210, However, the structure of the pivot 212 or the attachment mechanism may be arranged to limit the rotation of the paddle 210 so that the paddle 210 may not be allowed to rotate more than substantially 90 degrees. In particular, the rotation of the paddle 210 may be limited so that the paddle 210 may not point towards that end of the module 110C from which the material is fed in, but only to the end of the module 110C from which the material exits the module.

In the middle picture of FIG. 5, the actuating unit 120 (and the floor 208) is at the first position. In this case, the floor 208 has moved forward in the movement direction of the material. Therefore, also the material piles A-F, lying on the floor 208, have moved forward a distance which roughly corresponds to the cylinder-stroke distance, as shown with dashed arrows. New material E may have come in to the module 110A. It may be appreciated that the paddles 210 are now oriented towards the exit aperture 112 (are substantially parallel to the sidewall 202). This may be because the moving floor 208 has pushed the free ends of the paddles 210. Advantageously, in such orientation, the paddles 210 do not block the material moving along with the moving floor 208. The exit aperture 112 may now be closed by the moving floor 208.

In the lowest picture of FIG. 5, the floor 208 has been again retracted to the second position. As the floor 208 moves backwards, the free ends of the paddles 210 may again be pulled back so that the orientation of the paddles 210 is substantially transversely to the sidewall 202. This may be beneficial as then the paddles 210 may block the movement of the material backwards along the floor 208 moving backwards. Further, the exit aperture 112 may now again be open and material A may drop to the module 110B below. In this manner the material may mix and move forwards in impulses in the odd modules 110A, 110C.

The operation of the even modules 110B, 110D may identical to the operation of the odd modules 110A, 110C. However, it may be noted that in order for the movement direction of the material to be opposite in the odd and even modules, an even modules may be turned 180 degrees in horizontal plane when compared to an odd module. Also the floor 208 of an even module may have a cylinder-stroke distance offset with respect to the floor 208 of an odd module, as may be seen in FIGS. 4A and 4B.

Each module 110 may have an identical operation principle and affect similarly to the drying process of the material. Therefore, the more modules 110 there is, the more the apparatus 100 dries the material.

In another embodiment, the actuator unit may rotate the paddles 210 back-and-forth about the pivot 212 so as to impulsively move the material in the module forwards, i.e. towards the exit aperture 112. Here also the rotation of the paddle 210 may be limited about the pivot 212, as explained above. For example, looking at FIG. 2, the movement of the paddles 210 as shown with the dotted bi-directional arrows may move the material impulsively towards the exit aperture 112. In this embodiment, the floor 208 may be static and the exit apertures 112 may be constantly open. The movement of the paddies 210 may be caused by an actuating unit applying an electric or hydraulic motor coupled to the paddles 210, for example.

In yet one embodiment, each module 110 comprises a plurality of rotating paddle wheels for moving the material. The paddle wheel may be, e.g., hanging from the roof of the module 110 or otherwise disposed in the module 110 so that the paddles 210 of the rotating paddle wheel may impulsively move the material on the floor 208 of the module 110. In this embodiment, the actuator unit may be configured to rotate the paddle wheel. Further, in this embodiment the floor 208 may be static and the exit apertures 112 may be constantly open.

Let us look at further on the structure of the apparatus 100. In an embodiment, inner corners of the modules 110 are rounded so that the amount of material stuck at the inner corners is minimized.

In an embodiment, the uppermost module 110A is coupled to the material inlet 102 and the heat outlet 109, and the lowermost module 110D is coupled to the material outlet 104 and the heat inlet 108. This may provide for efficient drying/heating as the material needs to travel through the whole apparatus 100. It may be appreciated that at least the uppermost module 110A may be equipped with the roof. The roof may be integral part of the uppermost module or the roof may be detachably attached to the uppermost module 110A.

However, in an embodiment, at least one other module (such as module 110B, 110C) is additionally coupled to at least one of the following: a second heat inlet for inputting more heat to the apparatus 100, and a second heat outlet for enabling heat to exit the apparatus 100. However, these are not shown in the Figures. These may be beneficial in case of a need of extra heat or in case of accidental overheating. These inlet(s) and outlet(s) may be opened/closed on the basis of detecting a need of more or less heat. The detection may be made on the basis sensors indicating such need, or by monitoring the output material, for example.

It may be appreciated that the level of drying by the apparatus 100 may be controlled in many ways, such as by adding or removing modules, or by controlling the temperature or amount of the input heat. By adding a module, the material needs to traverse a longer distance in the apparatus 110, thereby causing the output product to be drier. On the other hand, by removing a module from the apparatus 100, the output material may be moister. Similarly, the dimensions of the modules 110 and/or the paddles 210 may be designed according to the to-be-dried material, for example. Such designing may benefit form empirical testing about which dimensions work best for which materials, for example.

Further, it may be appreciated that the increment of the drying capability by adding the module(s) may not affect the required area for the apparatus 100. The addition of the modules to the apparatus 100 only affects the height of the apparatus 100.

Owing to the proposed embodiments for moving the material in each of the modules 110, the material does not pile up (does not pelletize). The speed of the impulses (e.g. the speed of the cylinder strokes) may be adjusted so as to find the most optimal speeds for different material types. Similarly, the length of the impulses (e.g. the length of the cylinder strokes) may be adjusted on the basis the input material.

As said, the modules 110 may be mutually interchangeable. In an embodiment, different modules are releasably fixed on top of each other. Such fixing may be made with screws and bolts, or by quick clamping, for example. However, in an embodiment, at least the lowermost module 110D may be somewhat different, or at least some modifications may be needed, so as to provide for the coupling of inlets of the heat.

The modular structure of the apparatus 100 comprising a plurality of interchangeable modules 110 may provide ease of repair/maintenance because a damaged or otherwise mat-functioning module may be replaced with a new module without changing other parts of the apparatus 100. For example, imagine that the module 110C is damaged. Then, the user of the apparatus 100 may detach the modules 110A-110C from the supporting structure 106 (and from the actuating unit 120). The modules 110A-110C may then be lifted out of the apparatus 100 and the damaged module 110C may be replaced with a new module 110E. Then the modules 110A, 110B, 110E may be lifted back to the apparatus 100 and attached to the supporting structure 106 (and to the actuating unit 120). Thus, switching one or more of the modules 110 may be easy and fast.

In an embodiment, the cold replacement module 110E is disposed on the location of the damaged module 110C, so that the cold replacement module 110E relatively fast heats up. In another embodiment, the cold replacement module 110E is disposed as the uppermost module of the apparatus 100, so that the cold module 110E does not disturb the already heated lower portion of the apparatus 100.

As above indicated, if, for example, the module 110B is disposed on the location of the previous (damaged module) 110C, the module 110B may need to be turned 180 degrees in a horizontal plane so that movement of the paddles 210 is appropriate.

The treatment of the material may be completely performed by applying only these modules 110A-110D. Therefore, in an embodiment, no other material treatment modules or elements are applied.

In an embodiment, the apparatus 100 may comprise at least one sensor for sensing at least one of the following: temperature of the material or the location in which the sensor is located, moisture content of the material, dry content of the material, particle size of the material, pressure of the location in which the sensor is located, flow of material. The location of the at least one sensor may be in at least one of the modules 110. The use of the sensor may be beneficial as then the user of the apparatus 100 obtains knowledge of how well the material has dried in a given location of the apparatus 100. In case it is detected that the material is already well dried in the middle parts of the apparatus 100, the amount or temperature of heat may be decreased or some of the modules 110 may be removed, for example. The pressure sensor and/or the temperature sensor may indicate a potential risk of an accident and the user may apply this knowledge in preventing the accident. The sensors may be wireless sensors transmitting the sensing results wirelessly to a user computer. The sensors may apply a thermometer or machine vision, for example.

There is also provided a method for drying material in a multi-module counterflow drying apparatus 100, the method comprising: feeding material to the upperpart of the apparatus 100, outputting material from the lower part of the apparatus 100, inputting heat to the apparatus 100 such that the heat traverses the apparatus 100 in the opposite direction than the material.

There is also provided a multi-module counterflow drying apparatus 100 for drying material, the apparatus comprising: a material input means 102 for inputting material to the upperpart of the apparatus, a material output means 104 for outputting dried material from the lower part of the apparatus, a heat input means 108 for inputting heat to the apparatus such that the heat traverses the apparatus in the opposite direction than the material, and a plurality of mutually interchangeable modules 110 stacked on top of each other, wherein the material is configured to move in the apparatus from one module to another such that the movement direction of the material in a given module is opposite to the movement direction of the material in a module above or below the given module, wherein each module comprises movable mixing means (e.g. the paddles 210) configured to discontinuously move the material forward in the module.

The apparatus 100 may further comprise at least one processor and at least one memory including a computer program code, wherein the at least one memory and the computer program code are configured, with the at least one processor, to cause the apparatus 100 to perform in the described manner. For example, the movement of the actuating unit 120 may be controlled by the processor or a circuitry of the processor. The memory may be implemented using any suitable data storage technology, such as semiconductor based memory devices, flash memory, magnetic memory devices and systems, optical memory devices and systems, fixed memory and removable memory.

The apparatus 100 may further comprise communication interface comprising hardware and/or software for realizing communication connectivity according to one or more communication protocols. The communication interface may provide the apparatus 100 with communication capabilities for indicating the result of the sensors, amount of material passed through the apparatus 100, for example. The apparatus 100 may also comprise a user interface comprising, for example, at least one keypad, a microphone, a touch display, a display, a speaker, etc. The user interface may be used to control the apparatus 100 by the user.

Some of the embodiments may be driven by a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method for drying material in a multi-module counterflow drying apparatus, the method comprising:
   feeding material to the upper part of the apparatus;
   outputting material from the lower part of the apparatus;
   inputting heat to the apparatus such that the heat traverses the apparatus in the opposite direction than the material, wherein the apparatus comprises:
   a plurality of mutually interchangeable modules stacked on top of each other, wherein the material is configured to move in the apparatus from one module to another such that the movement direction of the material in a given module is opposite to the movement direction of the material in a module above or below the given module, wherein each module comprises movable paddles configured to discontinuously move the material forward in the module.

2. A multi-module counterflow drying apparatus for drying material, the apparatus comprising:
   a material inlet for inputting material to the upper part of the apparatus;
   a material outlet for outputting dried material from the lower part of the apparatus;
   a heat inlet for inputting heat to the apparatus such that the heat traverses the apparatus in the opposite direction than the material; and
   a plurality of mutually interchangeable modules stacked on top of each other, wherein the material is configured to move in the apparatus from one module to another such that the movement direction of the material in a given module is opposite to the movement direction of the material in a module above or below the given module, wherein each module comprises movable paddles configured to discontinuously move the material forward in the module.

3. The apparatus of claim 2, wherein the uppermost module is coupled to the material inlet, and the lowermost module is coupled to the material outlet and the heat inlet.

4. The apparatus of claim 3, wherein at least one other module is additionally coupled to at least one of the following: a second heat inlet for inputting more heat to the apparatus, a heat outlet for enabling heat to exit the apparatus.

5. The apparatus of claim 2, wherein each paddle is pivotally fixed at one of its ends to either of the sidewall of the module.

6. The apparatus of claim 5, wherein the apparatus further comprises:
   an actuator unit configured to rotate the paddles back-and-forth about the pivot so as to impulsively move the material forward in the module.

7. The apparatus of claim 2, wherein the apparatus further comprises:
   an actuating unit configured to move a floor of each module back-and-forth.

8. The apparatus of claim 7, wherein the movement of the floor back-and-forth in a given module periodically opens and closes an exit aperture of the module for allowing moving material to drop out of the module, wherein floors of adjacent modules are located with respect to each other such that when the exit aperture of one module is open, the exit aperture of the adjacent module is closed.

9. The apparatus of claim 7, wherein one end of each paddle is configured to move freely along the movement of the floor of the module, thereby causing the paddle to rotate back-and-forth about a pivot.

10. The apparatus of claim 9, wherein each paddle is configured to rotate about the pivot such that:
    when the floor has moved to the movement direction of the material, the paddle is substantially parallel to the sidewall, and
    when the floor has moved against the movement direction of the material, the paddle is substantially transversely to the sidewall.

* * * * *